United States Patent [19]
Kaufman, Jr. et al.

[11] 3,854,024
[45] Dec. 10, 1974

[54] ENVIRONMENTAL TEMPERATURE CONTROL SYSTEM

[75] Inventors: Harold B. Kaufman, Jr., New York; John P. McCarthy, College Point; Robert F. Schiffmann, New York, all of N.Y.

[73] Assignee: DCA Food Industries Inc., New York, N.Y.

[22] Filed: Feb. 1, 1974

[21] Appl. No.: 438,951

[52] U.S. Cl. .............................. 219/10.55, 219/492
[51] Int. Cl. ............................................... H05b 9/06
[58] Field of Search .......... 34/1; 219/411, 413, 492, 219/10.55

[56] References Cited
UNITED STATES PATENTS

| | | | |
|---|---|---|---|
| 2,595,748 | 5/1952 | Andrews | 219/10.55 |
| 3,185,809 | 5/1965 | Bohm et al. | 219/10.55 |
| 3,569,656 | 3/1971 | White et al. | 219/10.55 |

Primary Examiner—E. A. Goldberg
Assistant Examiner—Hugh D. Jaeger
Attorney, Agent, or Firm—Amster & Rothstein

[57] ABSTRACT

A combined microwave-infrared oven having heating elements mounted therein is provided with an air-sampling manifold protected from microwave exposure by traps and located external to the oven which includes an air blower for circulating air from the microwave oven through the air-sampling manifold. A temperature sensor is mounted within the air-sampling manifold and when the air temperature of the microwave cavity reaches a desired level, the temperature sensor controls will operate to shut-off power to the heating elements and when it reaches a differential temperature below this level will operate to supply power to the heating elements. The system is also provided with a control device to regulate the power output level of the heating elements independent of the temperature sensor serving to minimize the frequency of undesirable on-off cycling of the heating elements as caused by the operation of the temperature sensor.

8 Claims, 3 Drawing Figures

ENVIRONMENTAL TEMPERATURE CONTROL SYSTEM

The present invention relates generally to a temperature control system for a combined microwave-infrared oven cavity and, in particular, to an environmental temperature control system in which the air temperature inside the microwave-infrared cavity is sensed and controlled without interference from or interaction with microwave or infarared radiation.

Today, in many commercial establishments, a food product is stored in its frozen form and must be quickly reconstituted at the commercial establishment when the food product is ordered by the consumer. The reconstituting of the food product, such as frozen casseroles and the like, is accomplished by inserting the frozen food product into a reconstituting chamber. Typically, the reconstituting chamber may include a microwave oven for quick reconstitution of the food product.

Microwave oven cavities have also been developed for commercial food processing wherein the cavity includes entry and exit ports and a conveyor is provided for transporting products to be exposed to microwave energy from a pickup point external to the entry port, through the microwave cavity and along an exposure path to a drop-off point external to the exit port. In addition, to prevent the escape of microwave energy from such microwave cavities, fixed end traps are usually provided at the entry and exit ports.

In microwave oven cavities of the general type described, it has now been found that optimum product results can be obtained by also subjecting the food product to a source of heat, such as infrared heating elements. However, to achieve the optimum product results, it is critical that such application of heat meet two conditions: first, it must be accomplished while maintaining a minimum of air velocity over the food product and, second, the air temperature within the microwave cavity must be maintained at a relatively constant level. It was found that the first condition could be met by installing the heating elements within the microwave cavity rather than outside the microwave cavity. This would substantially reduce the velocity of the air over the food product, as it would eliminate the need for blowing the heated air in from external heating elements. To meet the second condition, however, a temperature sensor would be necessary — but it was found that if the sensor was mounted within the microwave cavity, it would undesirably interfere and interact with the application of the microwave and infrared energy. Accordingly, it was necessary to develop a system which would include heating elements mounted internally within the microwave cavity to minimize air velocity, and which would allow the air temperature within the microwave cavity to be sensed externally of the microwave cavity.

Broadly, it is an object of the present invention to provide an environmental temperature control system for a microwave-infrared cavity which realizes one or more of the aforesaid objectives. More particularly, it is among the objectives of the present invention to provide a microwave-infrared reconstituting chamber wherein precise adjustment and maintenance of air temperature may be realized during treatment of the food product with microwave and infrared energy; wherein the air temperature within the microwave cavity may be sensed without interference from or interaction with microwave or infrared energy; wherein a minimum controlled air flow is established which uniformly contacts the exterior surfaces of the food product during its residence time in the microwave cavity and during its concomitant exposure to the microwave energy; wherein air circulation inside the microwave cavity serves to enhance the uniformity of the air temperature in the cavity and achieves optimum product results; wherein effective isolation of the environmental temperature control is achieved without impeding either the effectiveness of the environmental control or the air flow to and from the microwave cavity under conditions which afford adequate personnel safety and complete compliance with corresponding safety regulations; wherein the system provides a minimum of changes in air temperature inside the microwave cavity, achieves minimum feasible air velocity over the product, yet facilitating optimum product results; wherein an economical and efficient environmental temperature control system is provided which assures that the temperature controlled air is constantly recirculated through the reconstituting chamber with minimal air leakage from the common entry and exit port required to introduce and remove the food products therefrom; and wherein an environmental temperature control system is provided incorporating the necessary air control and microwave capability which is suitable for manufacture on a mass production basis and is easily installed, operated and maintained by typical personnel found in a commercial establishment.

In accordance with an illustrative embodiment demonstrating objects and features of the present invention, there is provided an enclosure which defines the microwave-infrared cavity having heating elements mounted therein and having a common entry and exit port, with provision for establishing within the cavity a microwave field. A conveyor is arranged for transporting the food products to be exposed to the microwave energy into the microwave cavity from a conveyor station external to the common entry and exit port, and after exposure back to the conveyor station external to the common port. The microwave cavity is provided with an air-sampling zone external to the cavity in the form of an air-sampling manifold which includes air blower means for exhausting air from the microwave cavity into the air-sampling manifold and recirculating the air through the microwave cavity with a minimum air velocity. A temperature sensor is mounted within the air-sampling manifold so that it may operate without interference from or interaction with the microwave and infrared energy within the microwave cavity and is operatively connected to control the heating elements within the microwave cavity.

Accordingly, when the temperature sensor determines that the temperature of the air passing through the sampling zone or air manifold has reached a desired level, the temperature sensor will operate to open a temperature sensitive switch and a relay switch to shut-off the supply of power to the heating elements. When the temperature sensor senses a differential temperature level below the desired level it will operate to supply power to one or both of the heating elements to raise the temperature in the microwave cavity back to the desired level. When the air temperature is returned to the desired level, the temperature sensitive switch and relay switch are opened and power to the heating elements is again shut off. In addition, the air circulation system simultaneously serves to enhance the uniformity of the air temperature within the microwave cavity but without excessive air velocity over the product.

The environmental temperature control system may be provided with additional means for controlling the operation of the heating elements which includes a percentage timer for setting predetermined time intervals during which the heating elements should be on and off intermittently and a regulating switch which is continuously opened and closed by the timer to turn the heating elements on or off. In this manner, if the temperature level within the microwave cavity drops during the time interval in which the regulating switch is open, power will not be supplied to the heating elements even if the temperature sensitive switch and relay switch are closed. However, once the off time interval has expired and the timer closes the regulating switch, the heating elements may be operated. Accordingly, the controlling means regulates the power output level of the heating elements, serving to minimize the frequency of undesirable on-off cycling of the heating elements as caused by operation of the temperature sensor and control.

The above brief description as well as further objects, features and advantages of the present invention will be more fully appreciated by reference to the following detailed description of a presently preferred, but nonetheless illustrative embodiment demonstrating objects and features of the present invention, when taken in conjunction with the accompanying drawings, wherein.

Figure 1:
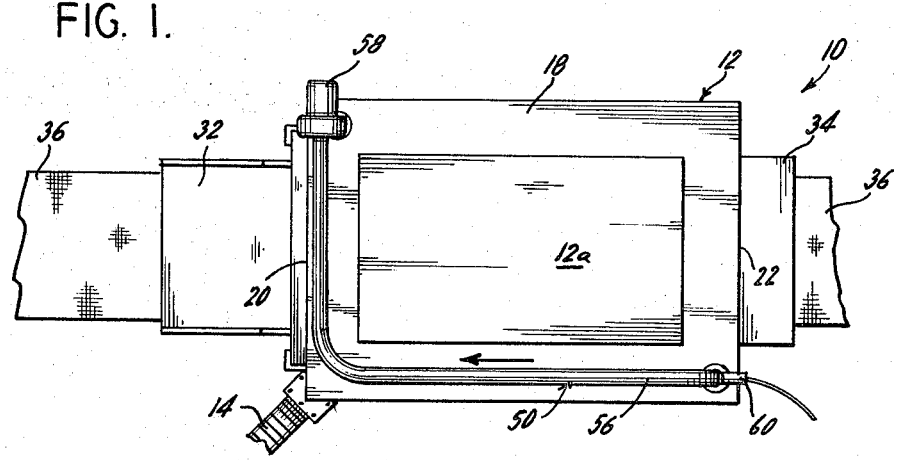
FIG. 1 is a top plan view, with parts broken away, showing a microwave system embodying features of the present invention.
Figure 2:
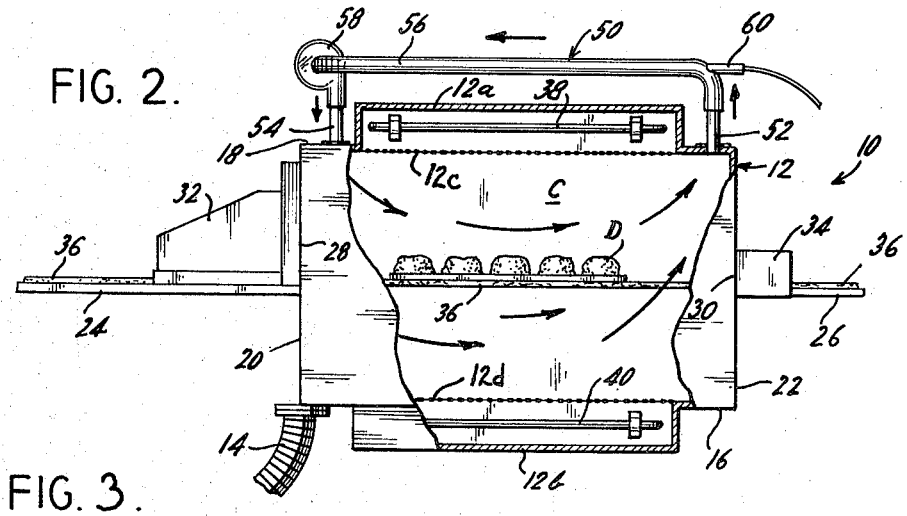
FIG. 2 is a side elevational view, with parts broken away and sectioned, to show the internal construction of the microwave cavity.

Referring now specifically to the drawings and in particular to FIGS. 1 and 2, there is shown a combination microwave-infrared oven embodying features of the present invention and generally designated by the reference numeral 10 which includes a housing or enclosure 12 providing a microwave cavity C. Provision is made from an appropriate microwave generator (not shown) via an appropriate coupling, such as connecting waveguide 14, for introducing microwave energy into cavity C to provide, for example, 1,000 watts of microwave power output. Further details of the establishment of the microwave field and its purposes are well known in the art.

The housing or enclosure 12 may be fabricated in any convenient fashion in accordance with techniques generally understood for establishing microwave cavities, with the housing 12 including bottom wall 16, top wall 18, and leading and trailing end walls 20, 22. Projecting outwardly from end wall 20 of housing 12 is an entry end conveyor supporting extension 24 and projecting outwardly from end wall 22 is an exit end conveyor supporting extension 26. Supporting extensions 24, 26 are substantially at the level of corresponding conveyor entry and exit ports 28, 30 formed in end walls 20, 22.

Further, there is provided a product entry trap or tunnel 32 which projects from entry port 28 and a conveyor exit trap or tunnel 34 which projects from exit port 30. Tunnels or traps 32, 34 serve to reduce and substantially eliminate the leakage of microwave energy from cavity C and may take a variety of forms. For the present purposes, it will suffice to point out that tunnels 32, 34 are supported on the respective extensions 24, 26 and cooperate with platforms at the levels of the lower edge of the entry and exit ports 28, 30 to establish a horizontal supporting plane along which a conveyor belt 36 of a conventional conveyor passes. The food product to be exposed to the combined microwave-infrared oven 10 is delivered to a conveyor station external to entry port 28 in advance of the tunnel 32 and onto the moving conveyor belt 36 such that the food product D may enter through tunnel 32 and entry port 28, pass into cavity C along a path defined by the horizontal plane along which the belt 36 moves, halt for exposure, and subsequently exit through common port 28 and tunnel 32 to the common external conveyor station from which the reconstituted food products may be retrieved.

Also disposed in cavity C in upper and lower compartments 12a, 12b, formed in housing 12, are suitable upper and lower heating elements 38, 40 which may be of the infrared type, as is well known in the art. Advantageously, the heating elements are located in cavity C to minimize the velocity of the heated air being applied to food product D. If the heating elements were external to cavity C, the velocity of the heated air would have to be substantially greater in order to transfer the required heat capacity into cavity C and over food product D. In addition, in order to prevent microwave radiation from affecting heating elements 38, 40, and heating elements 38, 40 from affecting the microwave field, suitable microwave chokes 12c, 12d are employed to separate respective compartments 12a, 12b from microwave cavity C. Heating elements 38, 40 may be selectively operated with the microwave power source to provide any suitable cycle of operation within microwave cavity C. For example, the microwave power source may be operated intermittently or continuously. In addition, heating elements 38, 40 may be operated intermittently or continuously. Accordingly, it will be understood that heating elements 38, 40 and microwave power source may be operated to produce any desired cycle and any desired operating conditions within microwave cavity C to control the environment therein for optimum product results.

In order to accurately control the air temperature within microwave cavity C without interference from or interaction with the microwave or infrared energy within microwave cavity C, an air-sampling zone 50 is provided for continuously sampling the air within microwave cavity C to determine if it is at the desired temperature level and to determine if it is necessary to activate or deactivate heating elements 38, 40. Air-sampling zone 50 includes an air flow and circulation system for continuously exhausting air from microwave cavity C to determine its temperature and then recirculating it through microwave cavity C at a minimum air velocity, as shown by the arrows in FIG. 2. Air-sampling zone 50 includes inlet and outlet microwave traps 52, 54 connected to the top wall 18 of housing 12 in order to substantially eliminate the leakage of microwave energy from cavity C. Inlet and outlet traps 52, 54 are connected by an air-sampling manifold 56 and an air blower and motor 58 for circulating air from microwave cavity C through air-sampling zone 50. In addition, a temperature sensing probe or sensor 60 is mounted within air-sampling manifold 56 adjacent inlet trap 52 to sense the temperature of the sampled air in accordance with operation of control system 70 shown in FIG. 3. Accordingly, air blower and motor 58 operate to continuously exhaust air from the microwave cavity C through inlet trap 52, past temperature sensing probe 60, through air-sampling manifold 56 where the air is then blown by air blower 58 through outlet trap 54 and recirculated through microwave cavity C.

Figure 3:
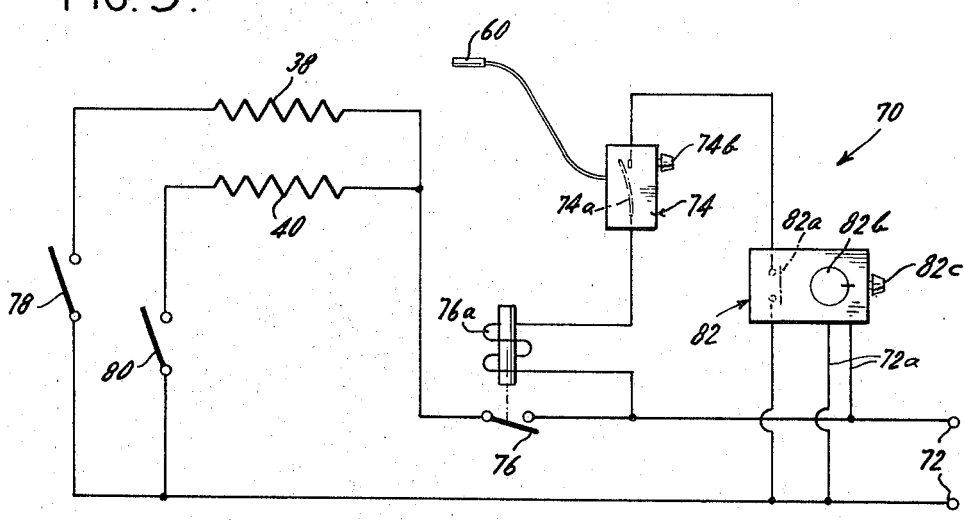
FIG. 3 is a diagrammatic and schematic view showing the temperature control circuit to be employed in conjunction with the microwave system shown in FIGS. 1 and 2.

The control system 70 is shown in FIG. 3 and is connected at 72 to a suitable AC power source, such as a 220 volt line. Control system 70 includes a thermostatic controller 74, a relay switch 76, manually operable switches 78, 80 for selectively operating heating elements 38, 40 and regulating means 82 for further controlling the operation of heating elements 38, 40. Thermostatic controller 74 includes temperature sensor 60, a temperature sensitive or thermostatic switch 74a and a suitable control knob 74b for setting the temperature level desired in the microwave cavity C. As is normally understood in the art, if temperature sensor 60 senses that the temperature of the air in air-sampling manifold 56 has dropped to a differential temperature level set by control knob 74b, it will operate to close thermostatic switch 74a. Assuming for a moment that regulating switch 82a of regulating means 82 is closed, the closing of thermostatic switch 74a will operate to complete a circuit which energizes relay coil 76a and closes relay switch 76. In this manner, if either or both of the manually operable switches 78, 80 have been closed, the control system will operate to energize either or both heating elements 38, 40 to increase the air temperature within microwave cavity C. When temperature sensor 60 senses that the air being exhausted from within microwave cavity C has reached the desired temperature level setting, temperature sensor 60 will cause thermostatic switch 74a to open and thereby de-energize relay coil 76a. Relay switch 76 will open and thereby cut off the supply of power to heating elements 38, 40.

Although it is desirable to accurately maintain the air temperature within microwave cavity C at a desired level, it has been found that excessive activation and deactivation by thermostatic switch 74a of heating elements 38, 40 has an undesired effect on food product D within cavity C. Accordingly, it is also desirable to further control the operation of heating elements 38, 40 independent of the operation of thermostatic controller 74. Control system 70 includes regulating means 82 which continuously operates to disable and then enable heating elements 38, 40 even if thermostatic switch switch 74a is closed, and therefore operates independently of thermostatic controller 74 to control the operation of heating elements 38, 40. Regulating means 82 includes regulating switch 82a, a percentage timer 82b for opening and closing regulating switch 82a and a control knob 82c for setting timer 82b for various timer cycle percentages during which regulating switch 82a is opened and closed by timer 82b. For example, assume that the cycle time is set for ten seconds: if timer 82b is set for 70 percent of the cycle time, it will operate to open regulating switch 82a for three seconds and then close regulating switch 82a for seven seconds during each ten second time cycle. Accordingly, it should be clear that when timer 82b operates to open regulating switch 82a, the control circuit is opened and power cannot be supplied to heating elements 38, 40. As may be seen in FIG. 3, timer 82b is supplied power directly from power source 72 along lines 72a. As an alternative embodiment, instead of employing manual control knob 82c, it would also be possible to connect percentage timer 82b to thermostatic controller 74 so that it will automatically adjust the setting of percentage timer 82b to increase or decrease the amount of time during a cycle that regulating switch 82a is opened or closed.

In operation, when temperature sensing probe 60 senses that the air temperature within air-sampling manifold 56 and microwave cavity C has fallen differentially below the desired temperature level set by control knob 74b, thermostatic switch 74a will close. When this happens, regulating switch 82a may be in its momentarily opened or closed cycle. (1) If regulating switch 82a is closed, a circuit will be completed when thermostatic switch 74a closes, and relay coil 76a will be energized and will close relay switch 76 so that power is supplied to heating elements 38, 40. Heating elements 38, 40 will then operate until the temperature of the air within microwave cavity C is returned to the preset level as sensed by temperature sensor 60 or until regulating switch 82a is opened by timer 82b. (2) If regulating switch 82a is momentarily open when thermostatic switch 74a closes, the circuit cannot be completed to energize heating elements 38, 40. However, when timer 82b closes regulating switch 82a, the circuit will be completed to energize heating elements 38, 40 until the air temperature in microwave cavity C is returned to the desired level or until regulating switch 82a is opened by timer 82b. Accordingly, it should be understood that regulating means 82 operates intermittently to prevent heating elements 38, 40 from being activated even if thermostatic switch 74a is closed.

From the foregoing, it will be appreciated that there has been provided in accordance with the present invention a practical and convenient means for establishing a controlled air temperature and air velocity in a microwave reconstituting chamber which is entirely compatible with the operation of the microwave cavity. Precise adjustability and maintenance of air temperature is achieved by sensing the air temperature within the microwave cavity without microwave or infrared interference or interaction. Simultaneously, the air circulation through cavity C achieves optimum product results since the product is uniformly contacted with a controlled air flow during its time in the microwave field and since the air circulation enhances the uniformity of the air temperature inside the cavity. In addition, optimum product results are achieved due to the operation of the regulating means which may be operated to selectively control the power output level of the heating elements serving to minimize detrimental on and off cycling of the heating elements within the microwave cavity. The equipment realizes the several requirements for microwave reconstituting of frozen products on a production basis and provides a high degree of control over the temperature of the air, all in a manner readily handled and serviced by comparatively unskilled personnel.

A latitude of modification, change and substitution is intended in the foregoing disclosure, and in certain instances, some features of the invention will be used without a corresponding use of other features. Accordingly, it is appropriate that the appended claims be construed broadly and in a manner consistent with the spirit and scope of the present invention.

What is claimed is:

1. In a microwave system, an enclosure defining a microwave cavity having heating means mounted therein, means defining an air-sampling zone external to said microwave cavity, means including microwave traps for connecting said air-sampling zone to said microwave cavity, means for drawing air from said microwave cavity into said air-sampling zone and returning air to said microwave cavity, a thermostatic control operatively connected to a power source and in controlling relation to said heating means and including a temperature sensor in said air-sampling zone operable to sense the temperature of the air passing through said air-sampling zone without being effected by the microwave energy in said microwave cavity, and said thermostatic control being responsive to said temperature sensor and controlling operation of said heating means to maintain the temperature of the air in said microwave cavity at a desired level.

2. A microwave system according to claim 1 further including means operatively connected to said thermostatic control and operatively connected to said power source for regulating the power output level of said heating means independent of said thermostatic control by continuously enabling and then disabling the supply of power to said heating means.

3. A microwave system according to claim 2 wherein said regulating means includes a timer for setting predetermined time intervals and a regulating switch which is continuously opened and closed by said timer independent of said temperature sensor.

4. A microwave system according to claim 1 further including conveyor means for transporting products into and out of said microwave cavity to be exposed to microwave energy.

5. A microwave system according to claim 1 wherein said air-sampling zone includes an air-sampling manifold, said microwave traps connecting said air-sampling manifold to said microwave cavity.

6. A microwave system according to claim 5 wherein said drawing and returning means includes a motor-driven air blower connected to said air-sampling manifold for circulating air through said microwave cavity at a minimum air velocity.

7. A microwave system according to claim 1 wherein said heating means includes at least two heating elements mounted within said enclosure and manually operable switches for selectively connecting either or both of said heating elements to said thermostatic control.

8. A microwave system according to claim 7 wherein said heating elements are of the infrared type.

* * * * *